(12) United States Patent
Chang et al.

(10) Patent No.: US 11,448,294 B2
(45) Date of Patent: Sep. 20, 2022

(54) LINKAGE MECHANISM

(71) Applicants: Chin-Hsien Chang, Taipei (TW); Chih-Hsueh Tsai, Taipei (TW)

(72) Inventors: Chin-Hsien Chang, Taipei (TW); Chih-Hsueh Tsai, Taipei (TW)

(73) Assignee: COMPAL ELECTRONICS, INC, Taipei (TW)

( * ) Notice: Subject to any disclaimer, the term of this patent is extended or adjusted under 35 U.S.C. 154(b) by 428 days.

(21) Appl. No.: 16/744,211

(22) Filed: Jan. 16, 2020

(65) Prior Publication Data

US 2021/0010576 A1 Jan. 14, 2021

(30) Foreign Application Priority Data

Jul. 9, 2019 (TW) .................................. 108124112

(51) Int. Cl.
*F16H 25/14* (2006.01)
*G06F 1/16* (2006.01)
*F16C 11/12* (2006.01)
*F16C 11/04* (2006.01)

(52) U.S. Cl.
CPC ............ *F16H 25/14* (2013.01); *F16C 11/045* (2013.01); *F16C 11/12* (2013.01); *G06F 1/1624* (2013.01); *G06F 1/1662* (2013.01); *G06F 1/1681* (2013.01); *G06F 1/1616* (2013.01)

(58) Field of Classification Search
CPC ...... F16H 25/14; G06F 1/1662; G06F 1/1624; G06F 1/1681; F16C 11/045; F16C 11/12
See application file for complete search history.

(56) References Cited

U.S. PATENT DOCUMENTS

2016/0102487 A1\* 4/2016 Kuramochi ........... G06F 1/1618
16/371

FOREIGN PATENT DOCUMENTS

| CN | 205639268 | 10/2016 |
| TW | M353452 | 3/2009 |
| TW | M536198 | 2/2017 |

OTHER PUBLICATIONS

"Office Action of Taiwan Counterpart Application", dated Apr. 27, 2020, p. 1-p. 6.

\* cited by examiner

*Primary Examiner* — Abbas I Abdulselam
(74) *Attorney, Agent, or Firm* — JCIPRNET

(57) ABSTRACT

A linkage mechanism includes a pivoting assembly, a cam, a sliding assembly and at least one linkage. The cam pivots coaxially with the rotating axis of the pivoting assembly. A leaning element is located on one side of the cam. A sliding frame pivots the leaning element and has at least one limiting area. The linkage includes a main body portion, a first linkage portion protruded beyond the limiting area and a second linkage portion. When the pivoting assembly drives the cam to pivot from a first position to a second position, the cam pushes against the leaning element to slide the sliding frame in a first direction relative to a plate, and the limiting area interferes with the first linkage portion of the linkage to rotate the main body portion in a first clock direction to allow the second linkage portion to provide a thrust in a second direction.

12 Claims, 7 Drawing Sheets

LINKAGE MECHANISM

CROSS-REFERENCE TO RELATED APPLICATION

This application claims the priority benefit of Taiwan application serial no. 108124112, filed on Jul. 9, 2019. The entirety of the above-mentioned patent application is hereby incorporated by reference herein and made a part of this specification.

BACKGROUND OF THE INVENTION

1. Field of the Invention

The present invention relates to a linkage mechanism, and more particularly to a linkage mechanism suitable for an electronic device.

2. Description of Related Art

Generally speaking, the notebook computer is mostly composed of an upper body having a display screen and a lower body having a host system and/or a keyboard, wherein the upper body and the lower body are pivotally connected to each other through a pivoting structure. However, the conventional keyboard is in the same height state in both a use state and a non-use state, so that the overall thickness of the notebook computer cannot be reduced. Therefore, how to make the keyboard connected with a linkage member have different positions in the use state and the non-use state with the movement of the linkage member through the rotation of the pivoting structure has become one of the problems demanding prompt solution at present.

SUMMARY OF THE INVENTION

The present invention provides a linkage mechanism which is capable of providing acting forces in two different directions, thereby causing displacement of a base connected to a linkage and carrying a keyboard.

The linkage mechanism of the present invention is adapted to be assembled on a plate and includes a pivoting assembly, a cam, a sliding assembly and at least one linkage. The pivoting assembly includes a rotating axis. The cam is sleeved on the rotating axis to pivot coaxially with the rotating axis. The sliding assembly is assembled on the plate and includes a leaning element and a sliding frame. The leaning element is located on one side of the cam, and the sliding frame pivots the leaning element and has at least one limiting area. The linkage is assembled on the plate and located in the limiting area of the sliding frame. The linkage includes a main body portion, and a first linkage portion and a second linkage portion connecting the main body portion. The first linkage portion protrudes beyond the limiting area. When the pivoting assembly drives the cam to pivot from a first position to a second position, the cam pushes against the leaning element to slide the sliding frame in a first direction relative to a plate, and the limiting area of the sliding frame interferes with the first linkage portion of the linkage to rotate the main body portion in a first clock direction to allow the second linkage portion to provide a thrust in a second direction. The first direction is different from the second direction.

In an embodiment of the present invention, the linkage mechanism further includes an elastic member having a first end and a second end opposite to each other. The first end is fixed to the plate, and the second end is fixed to the sliding frame. When the pivoting assembly drives the cam to pivot from the first position to the second position, the elastic member is stretched in a third direction opposite to the first direction.

In an embodiment of the present invention, when the pivoting assembly drives the cam to pivot from the second position to a third position, the cam leans against the leaning element such that the sliding frame does not slide, and the limiting area of the sliding frame does not interfere with the first linkage portion of the linkage such that the main body portion does not rotate, and the elastic member has a maximum tensile deformation amount in the third direction.

In an embodiment of the present invention, when the pivoting assembly drives the cam to pivot from the third position to a fourth position, the elastic restoring force of the elastic member pulls the sliding frame to slide in the third direction, and the cam leans against the leaning element, the limiting area of the sliding frame interferes with the first linkage portion of the linkage to rotate the main body portion in a second clock direction to allow the second linkage portion to provide a pulling force in a fourth direction opposite to the second direction. The first clock direction is different from the second clock direction.

In an embodiment of the present invention, one of the first clock direction and the second clock direction is a clockwise direction. The other of the first clock direction and the second clock direction is a counterclockwise direction.

In an embodiment of the present invention, the sliding frame further has at least one locking groove. The linkage mechanism further includes at least one locking member passing through the locking groove of the sliding frame and positioned on the plate. When the pivoting assembly drives the cam to pivot from the first position to the second position, and when the pivoting assembly drives the cam to pivot from the third position to the fourth position, the locking groove of the sliding frame moves relative to the locking member.

In an embodiment of the present invention, the sliding frame further includes an arrangement groove, an extending direction of the arrangement groove is parallel to the first direction, and the elastic member is located in the arrangement groove.

In an embodiment of the present invention, the cam has a first assembly portion, and the sliding frame has a second assembly portion. When the cam is located in the first position, the first assembly portion is embedded in the second assembly portion.

In an embodiment of the present invention, one of the first assembly portion and the second assembly portion is a concave portion. The other of the first assembly portion and the second assembly portion is a convex portion.

In an embodiment of the present invention, the pivoting assembly further includes a hinge structure assembled with the rotating axis.

In an embodiment of the present invention, an included angle is formed between the first linkage portion and the second linkage portion of the linkage. The included angle is greater than 60 degrees and less than 120 degrees.

In an embodiment of the present invention, the first direction is perpendicular to the second direction.

Based on the above, in the design of the linkage mechanism of the present invention, the cam pushes against the leaning element of the sliding assembly to slide the sliding frame in the first direction to interfere with the first linkage portion of the linkage, causing the main body portion of the linkage to rotate to allow the second linkage portion to provide the thrust in the second direction. That is, the linkage mechanism of the present invention can provide acting forces in two different directions. In this way, in addition to generating a sliding force in the first direction, the linkage mechanism of the present invention can generate a thrust in the second direction, thereby causing displacement of the base connected to the linkage and carrying the keyboard.

In order to make the aforementioned and other objectives and advantages of the present invention comprehensible, embodiments accompanied with figures are described in detail below.

DESCRIPTION OF THE EMBODIMENTS

Figure 1A:
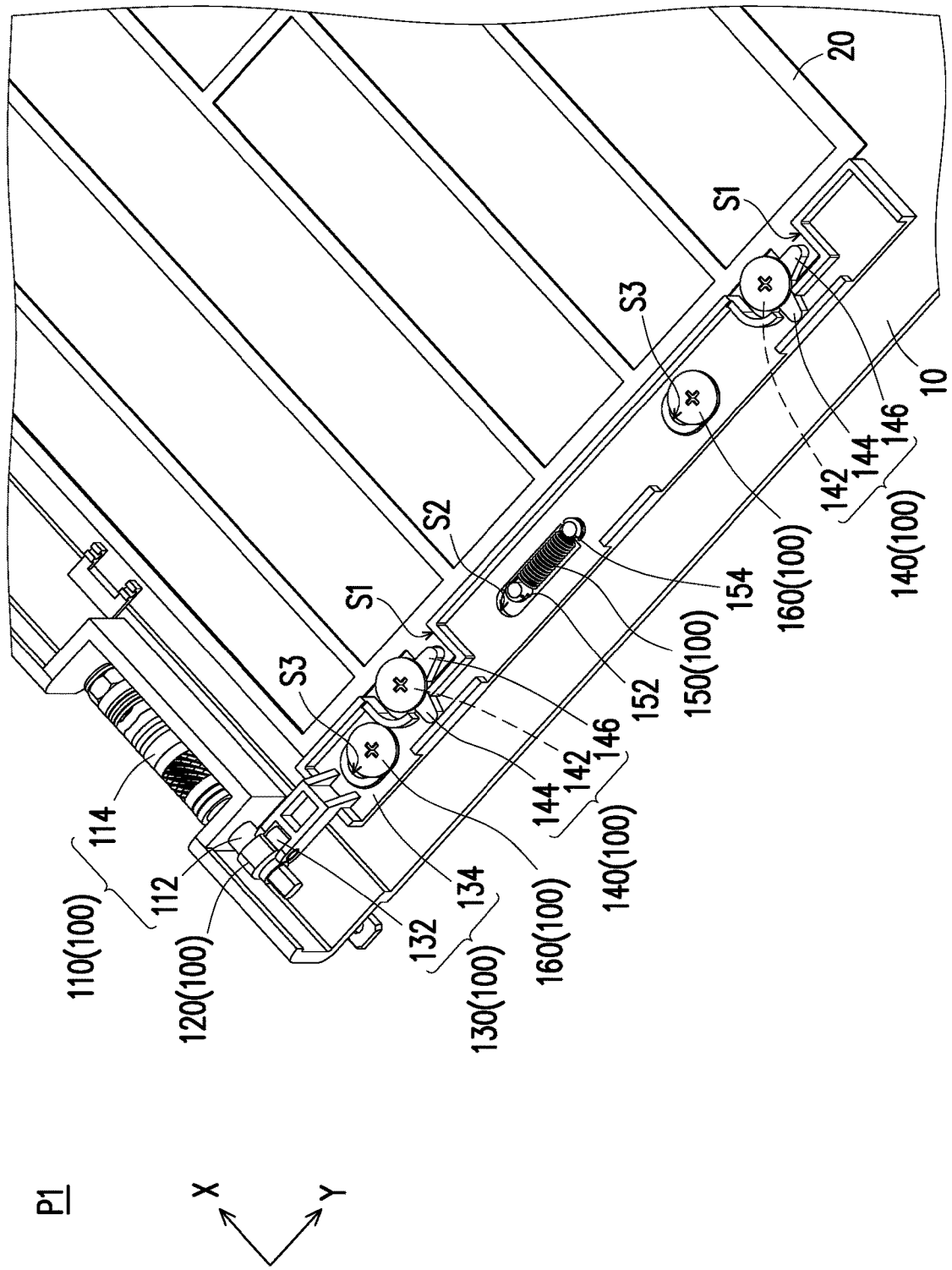
FIG. 1A is a three-dimensional schematic view of a linkage mechanism according to an embodiment of the present invention.
Figure 1B:
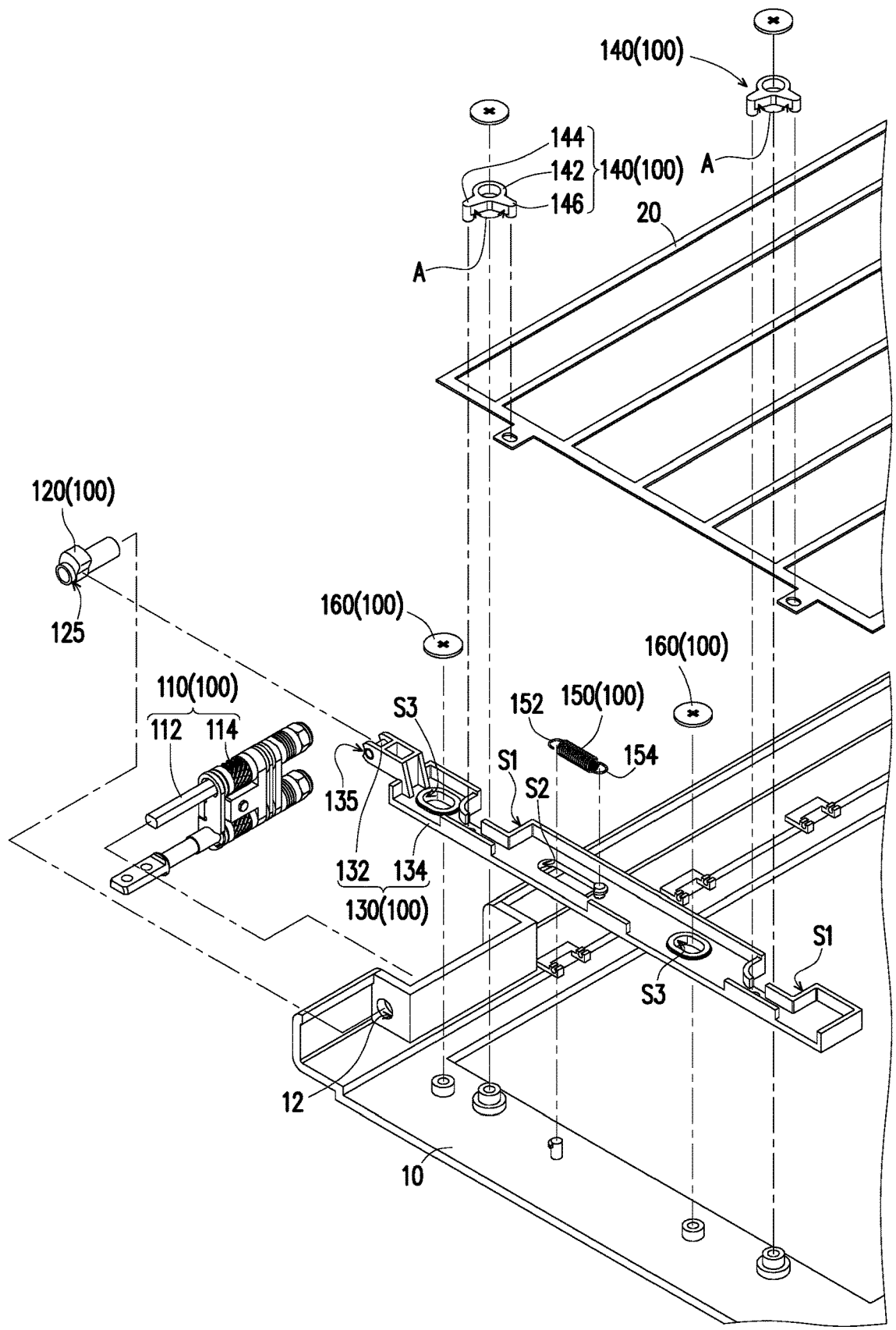
FIG. 1B is a three-dimensional exploded schematic view of the linkage mechanism of FIG. 1A.
Figure 1C:
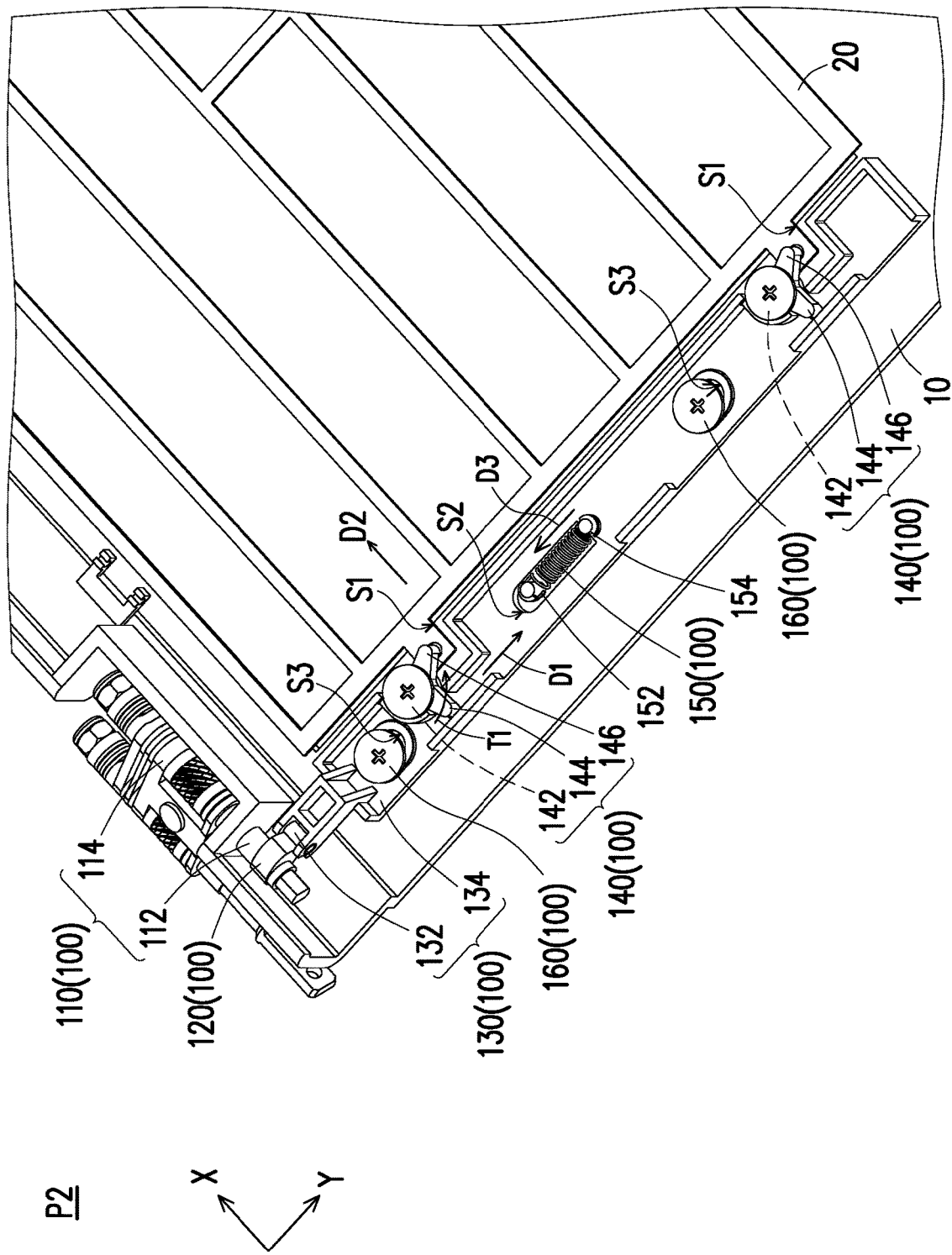
FIG. 1C to FIG. 1E are schematic views showing the actuation of the linkage mechanism of FIG. 1A.
Figure 1D:
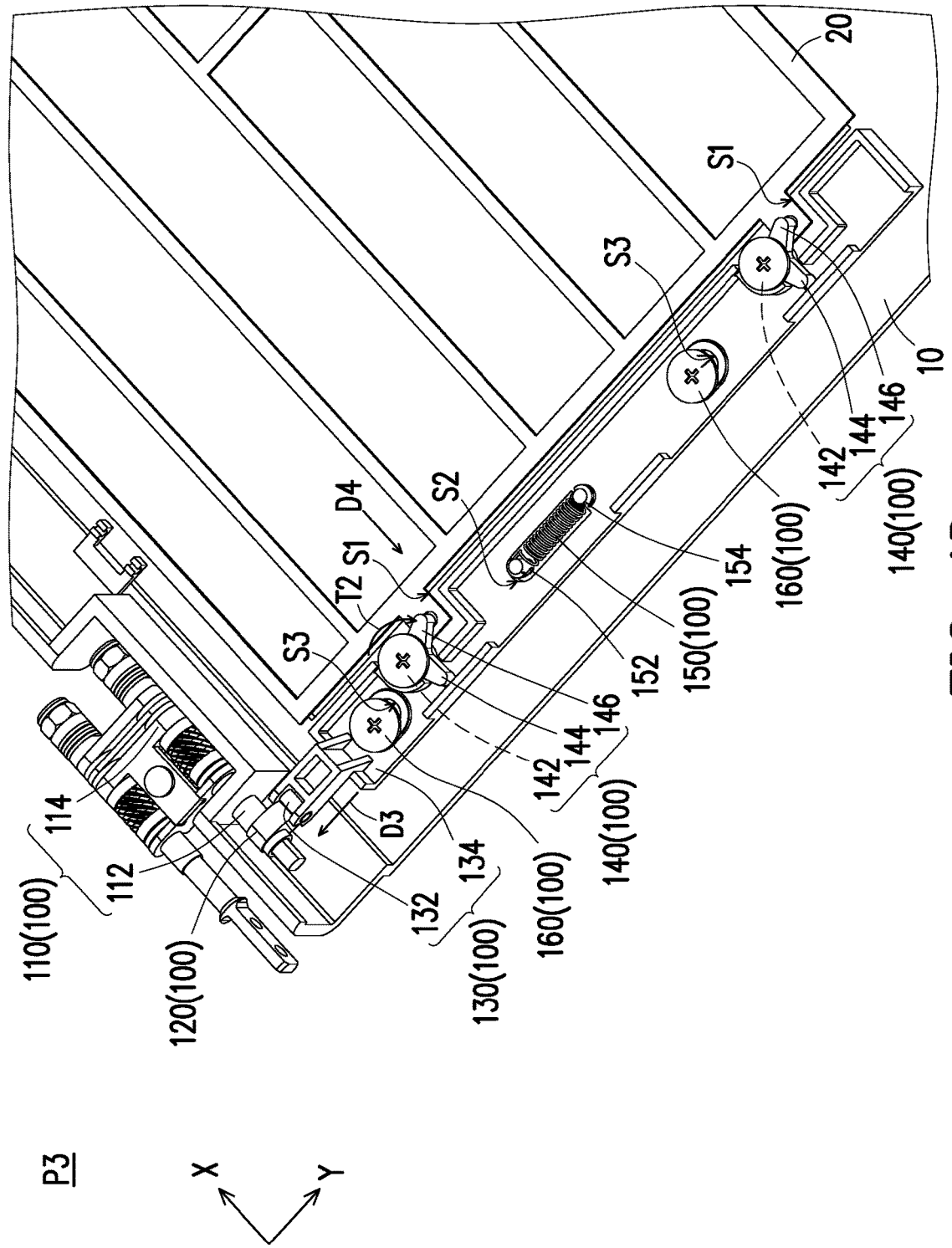
Figure 1E:
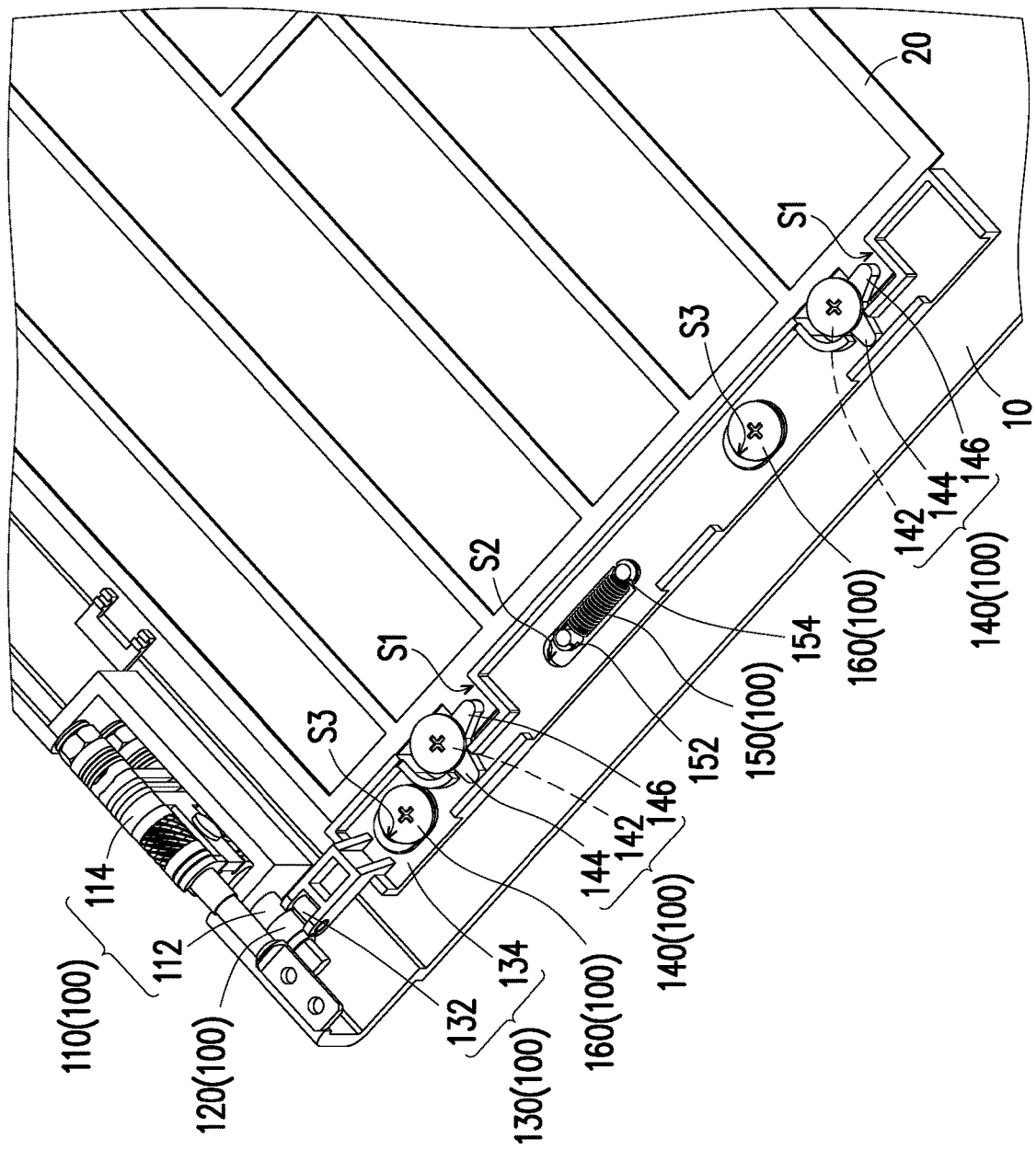

FIG. 1A is a three-dimensional schematic view of a linkage mechanism according to an embodiment of the present invention. FIG. 1B is a three-dimensional exploded schematic view of the linkage mechanism of FIG. 1A. FIG. 1C to FIG. 1E are schematic views showing the actuation of the linkage mechanism of FIG. 1A. FIG. 2A to FIG. 2D are cross-sectional schematic views of the linkage mechanism of FIG. 1A and FIG. 1C to FIG. 1E respectively.

Referring to FIG. 1A and FIG. 1B at the same time, in the present embodiment, the linkage mechanism 100 is adapted to be assembled on a plate 10, and the linkage mechanism 100 includes a pivoting assembly 110, a cam 120, a sliding assembly 130 and at least one linkage 140 (two are shown schematically). The pivoting assembly 110 includes a rotating axis 112, and the cam 120 is sleeved on the rotating axis 112 to pivot coaxially with the rotating axis 112. The sliding assembly 130 is assembled on the plate 10 and includes a leaning element 132 and a sliding frame 134. The leaning element 132 is located on one side of the cam 120, and the sliding frame 134 pivots the leaning element 132 and has at least one limiting area S1. The linkage 140 is assembled on the plate 10 and located in the limiting area S1 of the sliding frame 134. The linkage 140 includes a main body portion 142, and a first linkage portion 144 and a second linkage portion 146 connecting the main body portion 142. The first linkage portion 144 protrudes beyond the limiting area S1.

More specifically, the pivoting assembly 110 of the present embodiment further includes a hinge structure 114. The hinge structure 114 is assembled with the rotating axis 112. Herein, the hinge structure 114 of the pivoting assembly 110 pivots, for example, a first body (such as a display screen, not shown) and a second body (system host, not shown) of an electronic device (such as a notebook computer, not shown) such that the first body can be unfolded or closed relative to the second body. The rotating axis 112 of the pivoting assembly 110 is adapted to pass through a positioning hole 12 of the plate 10 of the second body and is rotatably positioned on the plate 10. The cam 120 has a curved profile and is sleeved on the rotating axis 112 of the pivoting assembly 110 to pivot coaxially with the rotating axis 112. Herein, the geometric center to edge of the cam 120 has a maximum radius and a minimum radius. In other words, the geometric center to edge of the cam 120 is not of a fixed value.

Referring again to FIG. 1A and FIG. 1B at the same time, the cam 120 of the present embodiment includes a first assembly portion 125, and the sliding frame 134 includes a second assembly portion 135. When the cam 120 is located in a first position P1, the first assembly portion 125 is fitted to the second assembly portion 135. Preferably, one of the first assembly portion 125 and the second assembly portion 135 is a concave portion, and the other of the first assembly portion 125 and the second assembly portion 135 is a convex portion. Herein, the first assembly portion 125 is embodied as a convex portion, and the second assembly portion 135 is embodied as a concave portion, but is not limited thereto.

Furthermore, the sliding frame 134 of the sliding assembly 130 of the present embodiment further includes an arrangement groove S2. An extending direction of the arrangement groove S2 is parallel to a first direction D1 (such as the Y direction, please refer to FIG. 1C). The linkage mechanism 100 further includes an elastic member 150, wherein the elastic member 150 is located in the arrangement groove S2. More specifically, the elastic member 150 of the present embodiment has a first end 152 and a second end 154 opposite to each other. The first end 152 is fixed to the plate 10, and the second end 154 is fixed to the sliding frame 134. Herein, the elastic member 150 can provide an elastic force, and is, for example, a tension spring, but is not limited thereto. In addition, the sliding frame 134 of the present embodiment further has at least one locking groove S3 (two are schematically shown), and the linkage mechanism 100 further includes at least one locking member 160 (two are schematically shown). The locking member 160 passes through the locking groove S3 of the sliding frame 134 and is positioned on the plate 10. Herein, the size of the locking groove S3 is greater than the size of the locking member 160, so when the sliding frame 134 slides in the first direction D1 (referring to FIG. 1C) relative to the plate 10, a relative movement can be generated between the locking member 160 and the locking groove S3.

In addition, referring again to FIG. 1A and FIG. 1B at the same time, the main body portion 142 of the linkage 140 of the present embodiment is assembled on the plate 10, and the linkage 140 is located in the limiting area S1 of the sliding frame 134. The first linkage portion 144 of the linkage 140 protrudes beyond the limiting area S1 of the sliding frame 134, so when the sliding frame 134 slides relative to the plate 10, the limiting area S1 of the sliding frame 134 interferes with (for example, pushes against) the first linkage portion 144 to rotate the main body portion 142 of the linkage 140 by an angle to allow the second linkage portion 146 to generate a thrust in a second direction D2 (referring FIG. 1C). That is, the linkage 140 of the present embodiment has a rotational degree of freedom. Preferably, an included angle A is formed between the first linkage portion 144 and the second linkage portion 146 of the linkage 140. The included angle A is, for example, greater than 60 degrees and less than 120 degrees. Herein, the first linkage portion 144 and the second linkage portion 146 of the linkage 140 are at 90 degrees, that is, the included angle A between the first linkage portion 144 and the second linkage portion 146 is 90 degree, which be considered as an L-shaped linkage.

Figure 2A:
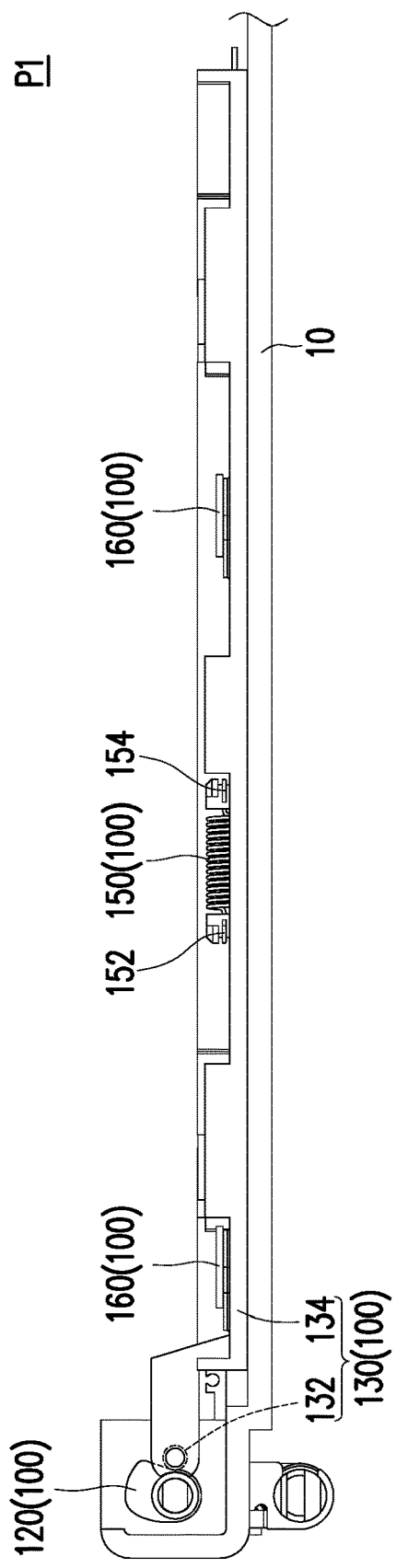
FIG. 2A to FIG. 2D are cross-sectional schematic views of the linkage mechanism of FIG. 1A and FIG. 1C to FIG. 1E respectively.
Figure 2B:
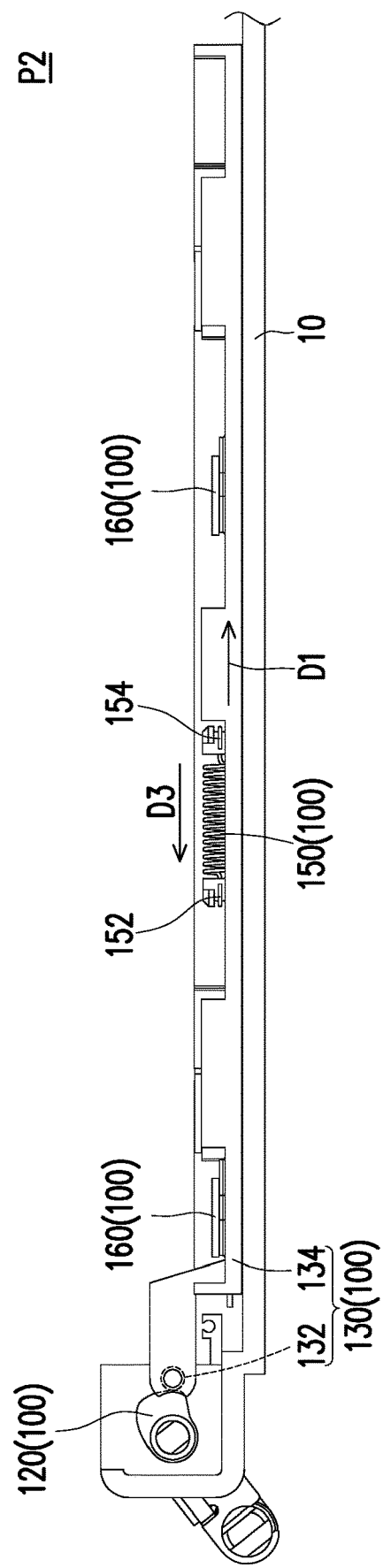
Figure 2C:
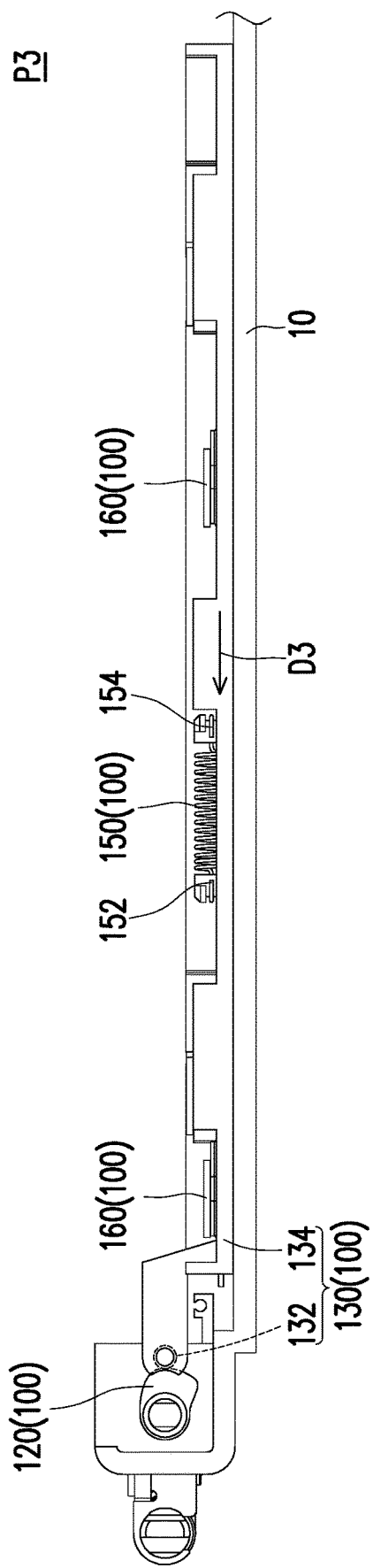
Figure 2D:
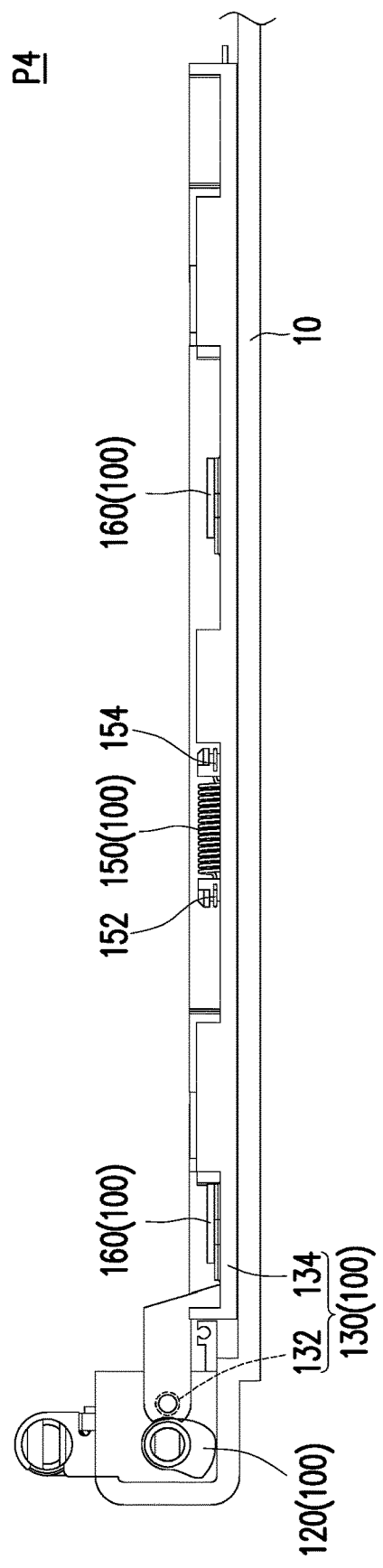

In the actuation of the linkage mechanism 100, referring to FIG. 1A and FIG. 2A at the same time, when the first body (such as the display screen, not shown) of the electronic device (not shown) is closed relative to the second body (the system host, not shown), that is, the angle is 0 degree, the cam 120 contacts the leaning element 132 of the sliding assembly 130 at a minimum radius. At this time, the cam 120 is located in the first position P1.

Next, referring to FIG. 1A, FIG. 1C, FIG. 2A and FIG. 2B at the same time, when the pivoting assembly 110 drives the cam 120 to pivot from the first position P1 to a second position P2, the cam 120 pushes against the leaning element 132 to slide the sliding frame 134 in the first direction D1 relative to the plate 10, and the limiting area S1 of the sliding frame 134 interferes with the first linkage portion 144 of the linkage 140 to rotate the main body portion 142 in a first clock direction T1 (such as a counterclockwise direction) to allow the second linkage portion 146 to provide a thrust in the second direction D2 (such as the X direction). At this time, the locking groove S3 of the sliding frame 134 and the locking member 160 also move relative to each other, and the elastic member 150 is stretched in a third direction D3 opposite to the first direction D1. The first direction D1 is different from the second direction D2. Preferably, the first direction D1 is perpendicular to the second direction D2, but is not limited thereto.

More specifically, when the pivoting assembly 110 pivots such that the opening angle of the first body (such as the display screen, not shown) relative to the second body (system host, not shown) is 0 degree to 90 degrees, the cam 120 rotates from the minimum radius to the maximum radius as the rotating axis 112 rotates such that the thrust allows the sliding frame 134 of the sliding assembly 130 to slide. After the first linkage portion 144 of the linkage 140 is pushed by the sliding frame 134, the main body portion 142 of the linkage 140 is rotated to allow the second linkage portion 146 to provide a thrust to cause displacement of a base 20 connected to the linkage 140 and carrying the keyboard (not shown). At this time, the elastic member 150 provides a pulling force for the sliding frame 134 in a third direction D3 opposite to the first direction D1. That is, the sliding frame 134 of the sliding assembly 130 moves in the first direction D1, and the elastic member 150 is stretched and generates an applied force to pull back the sliding frame 134 in a reverse direction (i.e., the third direction D3), so the applied force value needs to be increased when the cam 120 is pushed.

Next, referring to FIG. 1C, FIG. 1D, FIG. 2B and FIG. 2C at the same time, when the pivoting assembly 110 drives the cam 120 to pivot from the second position P2 to a third position P3, the cam 120 leans against the leaning element 132 such that the sliding frame 134 does not slide, and the limiting area S1 of the sliding frame 134 does not interfere with the first linkage portion 144 of the linkage 140 such that the main body portion 142 does not rotate, and the elastic member 150 has a maximum tensile deformation amount in the third direction D3.

When the pivoting assembly 110 pivots such that the opening angle of the first body (such as the display screen, not shown) relative to the second body (system host, not shown) is 90 degrees to 180 degrees, the cam 120 of this stage contacts the leaning element 132 of the sliding assembly 130 at a maximum radius. That is, the cam 120 continues to maintain the maximum radius as the rotating axis 112 rotates. Therefore, the cam 120 rotates but does not push the sliding assembly 130, so the sliding frame 134 does not move, that is, the sliding frame 134 of the sliding assembly 130 is stationary with no movement. Since the sliding frame 134 does not move, the limiting area S1 of the sliding frame 134 does not interfere with the first linkage portion 144 of the linkage 140, so that the main body portion 142 of the linkage 140 does not rotate. At this time, the elastic member 150 is stretched to the maximum value to generate a maximum reverse (i.e., the third direction D3) applied force.

Referring to FIG. 1D, FIG. 1E, FIG. 2C and FIG. 2D at the same time, when the pivoting assembly 110 drives the cam 120 to pivot from the third position P3 to a fourth position P4, the elastic restoring force of the elastic member 150 pulls the sliding frame 134 to slide in the third direction D3, and the cam 120 leans against the leaning element 132, the limiting area S1 of the sliding frame 134 interferes with the first linkage portion 144 of the linkage 140 to rotate the main body portion 142 in a second clock direction T2 (such as a clockwise direction) to allow the second linkage portion 146 to provide a pulling force in a fourth direction D4 opposite to the second direction D2 (referring to FIG. 1C). At this time, the locking groove S3 of the sliding frame 134 and the locking member 160 also move relative to each other. Further, the first clock direction T1 is substantially different from the second clock direction T2. That is, one of the first clock direction T1 and the second clock direction T2 is a clockwise direction, and the other of the first clock direction T1 and the second clock direction T2 is a counterclockwise direction.

More specifically, when the pivoting assembly 110 pivots such that the opening angle of the first body (such as the display screen, not shown) relative to the second body (system host, not shown) is 180 degrees to 360 degrees, the cam 120 rotates from the minimum radius to the maximum radius as the rotating axis 112 rotates. The cam 120 leans the leaning element 132 of the sliding assembly 130, the elastic member 150 provides an elastic restoring force to pull the sliding frame 134 to move in the third direction D3 so as to push the first linkage portion 144 of the linkage 140, so that the main body portion 142 of the linkage 140 rotates to cause the second linkage portion 146 to provide a pulling force in the fourth direction D4 to the base 20 connected to the linkage 140 and carrying the keyboard (not shown) to return to the original position.

In short, when the pivoting assembly 110 pivots such that the opening angle of the first body (such as the display screen, not shown) relative to the second body (system host, not shown) is 90 degrees to 180 degrees, referring to FIG. 1C and FIG. 1D, the distance of movement of the base 20 relative to the plate 10 is the largest. When the pivoting assembly 110 pivots such that the opening angle of the first body relative to the second body is greater than 180 degrees or less than 90 degrees, the distance of movement of the base 20 relative to the plate 10 is gradually reduced. When the pivoting assembly 110 pivots such that the angle of the first body relative to the second body is 0 degree or 360 degrees, referring to FIG. 1A and FIG. 1E, the base 20 returns to the original position. In other words, the linkage mechanism 100 of the present embodiment can slide the sliding frame 134 in the Y direction (i.e., the first direction D1 and the third direction D3), and displace the base 20 connected to the second linkage portion 145 of the linkage 140 and carrying the keyboard in the X direction (i.e., the second direction D2 and the fourth direction D4).

Based on the above, in the design of the linkage mechanism of the present invention, the cam pushes against the leaning element of the sliding assembly to slide the sliding frame in the first direction to interfere with the first linkage portion of the linkage, causing the main body portion of the linkage to rotate to allow the second linkage portion to provide the thrust in the second direction. That is, the linkage mechanism of the present invention can provide acting forces in two different directions. In this way, in addition to generating a sliding force in the first direction, the linkage mechanism of the present invention can generate a thrust in the second direction, thereby causing displacement of the base connected to the linkage and carrying the keyboard.

Although the present invention has been disclosed with the above embodiments, it is not intended to limit the present invention. Any person having ordinary skill in the art can make some changes and modifications without departing from the spirit and scope of the present invention. Therefore, the protection scope of the present invention shall be defined by the appended claims.

What is claimed is:

1. A linkage mechanism, adapted to be assembled on a plate, the linkage mechanism comprising:
    a pivoting assembly, comprising a rotating axis;
    a cam, sleeved on the rotating axis to pivot coaxially with the rotating axis;
    a sliding assembly, assembled on the plate and comprising a leaning element and a sliding frame, wherein the leaning element is located on one side of the cam, and the sliding frame pivots the leaning element and has at least one limiting area; and
    at least one linkage, assembled on the plate and located in the limiting area of the sliding frame, the linkage comprising a main body portion, and a first linkage portion and a second linkage portion connecting the main body portion, wherein the first linkage portion protrudes beyond the limiting area,
    wherein when the pivoting assembly drives the cam to pivot from a first position to a second position, the cam pushes against the leaning element to slide the sliding frame in a first direction relative to the plate, and the limiting area of the sliding frame interferes with the first linkage portion of the linkage to rotate the main body portion in a first clock direction to allow the second linkage portion to provide a thrust in a second direction, and the first direction is different from the second direction.

2. The linkage mechanism according to claim 1, further comprising:
    an elastic member, having a first end and a second end opposite to each other, the first end being fixed to the plate, and the second end being fixed to the sliding frame,
    wherein when the pivoting assembly drives the cam to pivot from the first position to the second position, the elastic member is stretched in a third direction opposite to the first direction.

3. The linkage mechanism according to claim 2, wherein when the pivoting assembly drives the cam to pivot from the second position to a third position, the cam leans against the leaning element such that the sliding frame does not slide, and the limiting area of the sliding frame does not interfere with the first linkage portion of the linkage such that the main body portion does not rotate, and the elastic member with a maximum tensile deformation amount in the third direction.

4. The linkage mechanism according to claim 3, wherein when the pivoting assembly drives the cam to pivot from the third position to a fourth position, an elastic restoring force of the elastic member pulls the sliding frame to slide in the third direction, and the cam leans against the leaning element, the limiting area of the sliding frame interferes with the first linkage portion of the linkage to rotate the main body portion in a second clock direction to allow the second linkage portion to provide a pulling force in a fourth direction opposite to the second direction, and the first clock direction is different from the second clock direction.

5. The linkage mechanism according to claim 4, wherein one of the first clock direction and the second clock direction is a clockwise direction, and the other of the first clock direction and the second clock direction is a counterclockwise direction.

6. The linkage mechanism according to claim 4, wherein the sliding frame further has at least one locking groove, and the linkage mechanism further comprises:
    at least one locking member, passing through the locking groove of the sliding frame and positioned on the plate, wherein when the pivoting assembly drives the cam to pivot from the first position to the second position, and when the pivoting assembly drives the cam to pivot from the third position to the fourth position, the locking groove of the sliding frame moves relative to the locking member.

7. The linkage mechanism according to claim 2, wherein the sliding frame further has an arrangement groove, an extending direction of the arrangement groove is parallel to the first direction, and the elastic member is located in the arrangement groove.

8. The linkage mechanism according to claim 1, wherein the cam has a first assembly portion, the sliding frame has a second assembly portion, and when the cam is located in the first position, the first assembly portion is embedded in the second assembly portion.

9. The linkage mechanism according to claim 8, wherein one of the first assembly portion and the second assembly portion is a concave portion, and the other of the first assembly portion and the second assembly portion is a convex portion.

10. The linkage mechanism according to claim 1, wherein the pivoting assembly further comprises a hinge structure assembled with the rotating axis.

11. The linkage mechanism according to claim 1, wherein an included angle is formed between the first linkage portion and the second linkage portion of the linkage, and the included angle is greater than 60 degrees and less than 120 degrees.

12. The linkage mechanism according to claim 1, wherein the first direction is perpendicular to the second direction.

* * * * *